Feb. 21, 1967   TOSHIO DOI   3,305,815
STRAIN GAUGES
Filed July 9, 1964
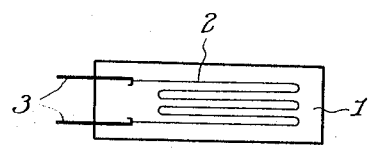
INVENTOR.
Toshio Doi
BY
Mosher & Western

United States Patent Office 3,305,815
Patented Feb. 21, 1967

3,305,815
STRAIN GAUGES
Toshio Doi, Minamitama-gun, Tokyo-to, Japan, assignor to Kabushiki Kaisha Hitachi Seisakusho, Tokyo-to, Japan, a joint-stock company
Filed July 9, 1964, Ser. No. 381,438
Claims priority, application Japan, July 13, 1963, 38/38,299
2 Claims. (Cl. 338—2)

This invention relates to strain gauges of the type wherein electrical resistance variations in a gauge filament due to strain is utilized to measure the strain. More particularly the invention concerns new strain gauges of this type made of binary alloys of platinum and osmium and ternary alloys of platinum, rhodium, and osmium.

Generally stated, it is an object of the present invention to provide strain gauges of this type having high gauge factors, various other highly desirable characteristics, and high uniformity of characteristics of the product.

Strain gauges of the type with which this invention is concerned are not only widely used for strain and deformation measurements, in general, but in recent years have also been used as elements to convert mechanical quantities into electrical quantities in industrial instruments such as self-balancing recorders.

In most applications, such strain gauges consist of fine metal wire or metal foil arranged, for example, in the form of a grid, which is intimately and firmly secured to an object whose strain is to be measured.

The sensitivity of such a gauge is determined by its so-called gauge factor GF, which is expressed by the following equation.

$$GF = (1+2\nu) + (\Delta\rho/\rho)/(\Delta l/l)$$

where:
$\nu$ is Poisson's ratio of the gauge filament material;
$\rho$ is the electrical resistivity of the gauge filament material; and
$l$ is the length of the gauge filament.

Since Poisson's ratio $\nu$ is approximately 0.3 in the case of metals, the quantity represented by $(\Delta\rho/\rho)/(\Delta l/l)$ must be made large in order to obtain a high value of GF.

The principal requirements for a strain gauge of this type are as follows: a high value of gauge factor, no variation with temperature of the gauge factor, and linearity of its strain-resistance characteristic. Some other requirements are: a high resistivity, a low temperature coefficient of resistance, a high elastic limit, good workability, uniform quality with little change with time (long operating life), low hysteresis, low thermo-electromotive force with respect to copper in the case of use with direct current, good workability for working into fine wire, good mechanical properties, good properties for soldering and brazing, and high resistance against oxidation and corrosion.

As conducive to a full appreciation of the utility of the present invention, the following consideration of known strain gauge materials is presented, reference being made to the accompanying Table 1 in which there are shown results of measurements of gauge factor, temperature coefficient of resistance, and electrical resistivity of known strain gauge materials.

TABLE 1

| Material | Gauge Factor (GF) | Temp. Coeff. of Resistance, Cf (×10⁻⁶/° C.) | Electrical Resistivity ($\mu\Omega$-cm.) |
| --- | --- | --- | --- |
| Cu-Ni | 2.12<br>2.1<br>2.12<br>2.05<br>2.04 | ±20 | 43–49 |
| Iso-Elastic | 3.56<br>3.53<br>3.6<br>3.6 | 470 | 80 |
| Ni-Cr | 2.55<br>2.1<br>2.63 | ±20 | 100–140 |
| Manganine | 0.47<br>0.5<br>0.47 | ±20 | 40–45 |
| Monel | 1.9 | 2,000 | 48 |
| Pt | 4.12 | 3,000 | 25 |

Of the materials shown in Table 1, the most widely used materials are the copper-nickel alloys. These alloys have the advantages of substantially low temperature coefficient of resistance and high resistivity. However, their gauge factors are of the order of 2, and, because of their nature, exhibit deviations in performance of from 5 to 10 percent among products in the same lot or between different lots. Furthermore, since these are alloys of base metals, they have the disadvantage of low resistance against oxidation and corrosion.

In addition, noble metal alloys are also being used, but none, as far as I am aware, has succeeded in satisfying all of the aforementioned requirements.

It is an object of the present invention to provide strain gauge materials which, to a substantial extent, fulfill the aforestated requirements.

More specifically stated, it is an object to provide an electrical resistance type strain gauge characterized by its composition comprising a binary alloy of platinum and osmium or a ternary alloy of platinum, rhodium, and osmium, and having highly desirable and advantageous features including a gauge factor of 4 or higher, relatively low temperature coefficient of resistance, relatively high electrical resistivity, other superior features, and, moreover, high uniformity of products.

The specific nature and details of the invention will be more clearly apparent by reference to the accompanying drawing and following description with respect to preferred embodiments of the invention, reference being made to Table 2, in which measured values of tensile strength, resistivity, thermoelectromotive force relative to copper, temperature coefficient or resistance, and gauge factor are shown for examples of alloys suitable for use in the strain gauge according to this invention.

The figure in the accompanying drawing shows an example of a strain gauge according to this invention, in which a thin metal wire is used. This example relates to an adherent type single gauge of lattice form. This gauge comprises a gauge base 1 onsisting of an insulating flexible film such as paper, paper impregnated with Bakelite, polyester sheet, etc., a gauge filament 2 adhered onto said base 1, and lead-wires 3.

ly long operating life) comparable to those of other metal materials.

Examples of temperature coefficients of resistance measured after samples of alloys were fabricated and assembled into strain gauges of foil type are shown in Table 3. It is to be observed from these results that excellent uniformity is exhibited, the deviation in temperature coefficient of resistance being of the order of 0.1 percent, which is far superior to deviations of from 5 to 10 percent in the case of Cu-Ni alloys used heretofore.

TABLE 2

| Composition (atomic percent) | | | Tensile Strength (kg./mm.$^2$) | Electrical Resistivity ($\mu\Omega$-cm.) | Thermo-Electromotive Force With Respect to Copper ($\mu$v./° C.) | Temp. Coeff. Resist. Cf ($10^{-4}$/° C.) | Gauge Factor (GF) |
| --- | --- | --- | --- | --- | --- | --- | --- |
| Pt | Rh | Os | | | | | |
| 98 | 0 | 2 | 83.0 | 14.4 | +0.1 | 24.8 | 4.5 |
| 95 | 0 | 5 | 114.0 | 20.1 | +6.2 | 16.1 | 5.0 |
| 90 | 0 | 10 | 176.0 | 31.6 | +7.8 | 9.8 | 5.5 |
| 53 | 45 | 2 | 152.0 | 18.8 | −1.7 | 12.5 | 4.2 |
| 50 | 45 | 5 | 187.0 | 21.4 | −0.6 | 10.4 | 4.4 |
| 45 | 45 | 10 | 152.0 | 28.4 | +0.5 | 7.3 | 4.7 |
| 76.2 | 23 | 0.8 | 70.9 | 21.1 | −3.5 | 16.5 | 4.1 |
| 65.6 | 34 | 0.4 | 83.1 | 20.6 | −2.7 | 14.2 | 4.1 |
| 87.7 | 11 | 1.3 | 63.2 | 20.7 | −5.5 | 25.2 | 4.1 |
| 74.1 | 25 | 0.9 | 76.5 | 21.9 | −3.8 | 17.6 | 4.1 |
| 79.3 | 20 | 0.7 | 68.3 | 21.1 | −3.0 | 15.4 | 4.1 |
| 70 | 20 | 1.0 | 160.3 | 29.5 | +3.6 | 7.9 | 5.0 |

As is observable in Table 2, the gauge factors of all alloys exceed 4, that in one case being as high as 5.5. The tensile strengths are considerably high, being in the range of approximately from 60 to 190 kg./mm.$^2$. At the same time, all alloys exhibit good workability and are readily workable into fine wire. Although the electrical resistivities, which are substantially from 20 to 30 microohm/cm., are somewhat lower than that of Cu-Ni alloys, this inadequacy can be overcome by working the wire material to finer diameters.

It is further observable that most of the values of thermo-electromotive force with respect to copper are within ±2 microvolt/deg. C., and the values of temperature coefficient of resistance are in many cases near $1.5 \times 10^{-3}$/deg. C. or therebelow. If the temperature coefficient of resistance of a strain gauge material is in the neighbourhood of $1.5 \times 10^{-3}$/deg. C., the temperature coefficient of resistance of the entire system can be readily made small through the use of a suitable compensation circuit. Furthermore, by using a suitable elastic material (thermal expansion coefficient $\alpha_s$) corresponding to the thermal expansion coefficient $\alpha_f$, temperature coefficient of resistance $C_f$, and gauge factor GF of the present gauge, it is also possible to obtain the following relationship.

$$\left(\frac{\Delta R}{R}\right)_t = (\alpha_s - \alpha_f) GF \Delta T + C_f \Delta T = 0$$

Furthermore, since the alloys used in the strain gauge according to the invention are noble metal alloys, they have high resistance against oxidation and corrosion and are readily soldered and brazed. In addition, if care is exercised in their heat treatment, these alloys can be caused to have amply low rates of change with time (amp-

TABLE 3

| Composition (atomic percent) | | | Sample (No.) | Temp. Coeff. of Resistance, Cf ($\times 10^{-6}$/° C.) |
| --- | --- | --- | --- | --- |
| Pt | Rh | Os | | |
| 90 | 0 | 10 | 1 | 980 |
| | | | 2 | 980 |
| | | | 3 | 981 |
| | | | 4 | 980 |
| | | | 5 | 980 |
| 45 | 45 | 10 | 1 | 730 |
| | | | 2 | 730 |
| | | | 3 | 730 |
| | | | 4 | 730 |
| | | | 5 | 730 |

Thus, the present invention provides a resistance strain gauge with characteristics which are superior to those of strain gauges heretofore available. The principle advantageous features of the strain gauge of this invention are as follows:

(1) A high gauge factor can be obtained;

(2) The temperature coefficient of resistance is relatively small;

(3) The deviations in characteristics determining quality of the product within one production lot or between lots are extremely small compared with those occurring in conventional strain gauges, and accordingly, the manufacturing procedure is simplified;

(4) Resistance to oxidation and corrosion is excellent;

(5) The gauge elements can be easily soldered and brazed;

(6) The gauge material has good workability, whereby they can be readily worked into fine wire or thin foil;

(7) The resistivity is of a suitable value;

(8) The thermo-electromotive force with respect to copper is relatively small; and (9) The tensile strength is substantially high, and, accordingly, the proportional limit is high, whereby relatively large strains can be measured.

Furthermore, the strain gauge of this invention possesses other good characteristics required for strain gauges and is applicable to a wide range of uses.

It should be understood, of course, that foregoing disclosure relates to only illustrative examples of the invention and it is intended to cover all changes and modifications of details as illustrated by the examples of the invention herein chosen for the purposes of the disclosure, which do not constitute departures from the spirit and scope of the invention as set forth in the appended claims.

I claim:

1. In a strain gauge device consisting of a strain element, leads, and a backing strip, an improvement wherein a binary alloy of platinum and osmium containing therein 90 to 99 atomic percent platinum is used as said strain element.

2. In a strain gauge device consisting of a strain element, leads, and a backing strip, an improvement wherein a ternary alloy of platinum, rhodium and osmium is used as said strain element, said alloy being composed of 45 to 90 atomic percent platinum, 10 to 45 atomic percent rhodium, and 0.1 to 10 atomic percent osmium.

References Cited by the Examiner

UNITED STATES PATENTS

| | | |
|---|---|---|
| 1,990,277 | 2/1935 | Feussner. |
| 2,206,616 | 7/1940 | Devereux. |
| 2,991,671 | 7/1961 | Bonn et al. _____ 338—2 X |
| 3,060,395 | 10/1962 | Sandven _____ 338—2 |
| 3,079,575 | 2/1963 | Singdale et al. _____ 338—2 |
| 3,202,951 | 8/1965 | Krinsky _____ 338—2 |

FOREIGN PATENTS 29,723   4/1911   Great Britain.

RICHARD M. WOOD, *Primary Examiner.*

W. D. BROOKS, *Assistant Examiner.*